United States Patent
Krebs (10) Patent No.: US 7,568,196 B2
(45) Date of Patent: Jul. 28, 2009

(54) INITIALIZING VIRTUAL MACHINE THAT SUBSEQUENTLY EXECUTES APPLICATION

(75) Inventor: Andreas Krebs, Karlsruhe (DE)

(73) Assignee: SAP AG, Walldorf (DE)

( * ) Notice: Subject to any disclaimer, the term of this patent is extended or adjusted under 35 U.S.C. 154(b) by 896 days.

(21) Appl. No.: 10/480,379

(22) PCT Filed: Jun. 3, 2002

(86) PCT No.: PCT/EP02/06079

§ 371 (c)(1),
(2), (4) Date: Jul. 8, 2004

(87) PCT Pub. No.: WO02/101549

PCT Pub. Date: Dec. 19, 2002

(65) Prior Publication Data

US 2004/0236715 A1     Nov. 25, 2004

(30) Foreign Application Priority Data

Jun. 11, 2001   (EP) ............................ 01114123

(51) Int. Cl.
*G06F 17/00* (2006.01)
*G06F 9/44* (2006.01)
*G06F 9/45* (2006.01)
*G06F 9/455* (2006.01)
*G06F 9/46* (2006.01)

(52) U.S. Cl. .................. 718/100; 707/100; 717/118; 717/143; 718/1

(58) Field of Classification Search ............ 718/1, 718/100, 102, 104; 717/101, 118, 125, 143; 715/237, 273, 264; 707/100
See application file for complete search history.

(56) References Cited

U.S. PATENT DOCUMENTS 5,687,366 A * 11/1997 Harvey et al. .............. 707/10

(Continued)

FOREIGN PATENT DOCUMENTS

EP     1 100 013 A2    5/2001

(Continued)

OTHER PUBLICATIONS

Resnik, "Parallel strands: a preliminary investigation into mining the web for bilingual text", Springer-Verlag, 1998, pp. 72-82.*

(Continued)

*Primary Examiner*—Van H Nguyen
*Assistant Examiner*—Caroline Arcos
(74) *Attorney, Agent, or Firm*—Finnegan, Henderson, Farabow, Garrett & Dunner, LLP (57) ABSTRACT

A method and a system for selecting a desired language for text displays in a Java-Type language is provided. A localization class in the loadable Java program defines the text portions of the displays. At start of the application, the Java virtual machine loads this class and a determination is made, by user input or otherwise, of which of a group of languages available should be used for the text. Based on the determination, the static initializer Java-type code is invoked, and it loads the appropriate language text from a markup language document, preferably an XML document. The appropriate text segments from the markup language document are then used to initialize the variables. The application then can proceed to run as usual. Preferably, after the static initialization, the fields of the localization class are checked to confirm that all fields contain text.

12 Claims, 10 Drawing Sheets

U.S. PATENT DOCUMENTS

| | | | | |
|---|---|---|---|---|
| 5,787,386 | A * | 7/1998 | Kaplan et al. | 704/8 |
| 5,805,775 | A * | 9/1998 | Eberman et al. | 706/11 |
| 5,966,702 | A * | 10/1999 | Fresko et al. | 707/1 |
| 6,024,289 | A * | 2/2000 | Ackley | 235/494 |
| 6,118,940 | A * | 9/2000 | Alexander et al. | 717/127 |
| 6,119,079 | A * | 9/2000 | Wang et al. | 704/8 |
| 6,209,124 | B1 * | 3/2001 | Vermeire et al. | 717/114 |
| 6,275,790 | B1 * | 8/2001 | Yamamoto et al. | 704/8 |
| 6,463,578 | B1 * | 10/2002 | Johnson | 717/124 |
| 6,492,995 | B1 * | 12/2002 | Atkin et al. | 715/703 |
| 6,526,426 | B1 * | 2/2003 | Lakritz | 715/264 |
| 6,535,894 | B1 * | 3/2003 | Schmidt et al. | 707/204 |
| 6,604,105 | B1 * | 8/2003 | Roth | 707/100 |
| 6,623,529 | B1 * | 9/2003 | Lakritz | 715/205 |
| 6,779,155 | B1 * | 8/2004 | Bahrs et al. | 715/234 |
| 6,898,618 | B1 * | 5/2005 | Slaughter et al. | 709/203 |
| 6,901,554 | B1 * | 5/2005 | Bahrs et al. | 715/210 |
| 6,964,014 | B1 * | 11/2005 | Parish | 715/205 |
| 7,013,351 | B2 * | 3/2006 | Bracewell et al. | 709/246 |
| 7,181,686 | B1 * | 2/2007 | Bahrs | 715/210 |
| 7,284,199 | B2 * | 10/2007 | Parasnis et al. | 715/201 |
| 7,340,389 | B2 * | 3/2008 | Vargas | 704/8 |
| 7,340,718 | B2 * | 3/2008 | Szladovics et al. | 717/106 |
| 2002/0023110 | A1 * | 2/2002 | Fortin et al. | 707/513 |
| 2002/0111788 | A1 * | 8/2002 | Kimpara | 704/2 |
| 2002/0143523 | A1 * | 10/2002 | Balaji et al. | 704/8 |
| 2002/0174161 | A1 * | 11/2002 | Scheetz et al. | 709/100 |
| 2003/0018502 | A1 * | 1/2003 | Rodriguez | 705/7 |
| 2004/0015862 | A1 * | 1/2004 | Dunn | 717/124 |
| 2004/0055005 | A1 * | 3/2004 | Creswell et al. | 719/315 |

FOREIGN PATENT DOCUMENTS

| | | |
|---|---|---|
| WO | WO 99/52032 A1 | 10/1999 |

OTHER PUBLICATIONS

Duguay, "Filtering with Servlets," JAVAPro, Apr. 1999, pp. 1-7.

McCluskey, "Using Java Reflection," java.sun.com, Jan. 1998, pp. 1-9.

"National Language String Separation Support for Java," IBM Technical Disclosure Bulletin, Feb. 1997, pp. 175-176, vol. 40, No. 02.

"Java Catalog File Process," IBM Technical Disclosure Bulletin, Jun. 1997, p. 115, vol. 40, No. 06.

"What Is an Object?," The JAVA™ Tutorial, <http://java.sun.com/docs/books/tutorial/java/concepts/object.html>, downloaded on Nov. 12, 2000, pp. 1-2.

"What Is a Class?," The JAVA™ Tutorial, http://java.sun.com/docs/books/tutorial/java/concepts/class.html., downloaded on Nov. 12, 2000, pp. 1-3.

"How do These Concepts Translate into Code?," The Java™ Tutorial, http://java.sun.com/docs/books/tutorial/java/concepts/practical.html, downloaded on Nov. 12, 2000, pp. 1-6.

"Lesson: Object-Oriented Programming Concepts," The Java™ Tutorial, http://java.sun.com/docs/books/tutorial/java/concepts/index.html, downloaded on Nov. 12, 2000, pp. 1-2.

"Execution," Java Language Specification, Second Edition, Chapter 12, http://java.sun.com/docs.books/jls/second_edition/html/execution.doc.html, downloaded on Jun. 10, 2000, pp. 1-17.

\* cited by examiner

```
251-1  PUBLIC CLASS              ← 201
       SAMPLE

{

251-2  PRIVATE STATIC            LANGUAGE = "en";
       STRING 251-3  PUBLIC STATIC             SAMPLE_STRING;
       STRING 251-4  PUBLIC STATIC             SAMPLE_ICON;
       STRING 251-5  PUBLIC STATIC             SAMPLE_CLASS;
       CLASS

}

CLASS
       PROVIDER
```

```
253-1  PRIVATE STATIC VOID
       GET_VALUES ( )
{

TRY

{

253-2  GET_VALUES_FROM_XML_DOCUMENT (LANGUAGE)

}

253-3 CATCH...

}
```
READER

```
<! DOCTYPE SAMPLEDOC

[ <! ELEMENT SAMPLEDOC (STRING*, ICON*, CLASS)>
  <! ELEMENT STRING (LABEL+) >
  <! ATTLIST STRING
              NAME ID #REQUIRED>
...
...

< SAMPLEDOC >                                          310'
    < STRING NAME = "SAMPLE_STRING" >
        < LABEL LANGUAGE="EN" >Welcome< /LABEL >
        < LABEL LANGUAGE="DE" >Willkommen< /Label >
    </ STRING >                                        320'
    < STRING NAME = "SAMPLE_ICON" >
        < FILE LANGUAGE="EN" >en.gif< /FILE >          311'
        < FILE LANGUAGE="DE" >de.gif< /FILE >
    < /ICON >                                          321'
    < CLASS NAME = "SAMPLE_CLASS" >
        < TYPE LANGUAGE="EN"                           312'
             >JAVA.LANGUAGE.INTEGER< /FILE >
        < TYPE LANGUAGE="DE"
             >JAVA.LANGUAGE.BOOLEAN< /FILE >
    </CLASS >                                          322'
</ SAMPLEDOC >

MARKUP LANGUAGE DOCUMENT
```

200-1 SYSTEM.OUT.PRINTLN(SAMPLE.SAMPLE_STRING);

...

200-2 G.DRAW IMAGE (SAMPLE.SAMPLE_ICON, ...)

APPLICATION

INITIALIZING VIRTUAL MACHINE THAT SUBSEQUENTLY EXECUTES APPLICATION

This application is a national stage filing under 35 U.S.C. § 371 of International Application No. PCT/EP02/06079, filed Jun. 3, 2002, which published in the English language. This application also claims the benefit of priority under 35 U.S.C. § 119(a) to European Patent Application No. 01114123.1, filed Jun. 11, 2001.

FIELD OF THE INVENTION

The present invention relates to systems and methods for providing various localized displays for programs, and especially for varying natural languages in displays associated with application programs written in a Java-type language.

BACKGROUND OF THE INVENTION

Almost all computer software applications involve displays shown to the user, and these displays almost invariably include text in natural language that is appropriate to the location of the system or to a user's preferred natural language.

Software applications are often written in the Java programming language. Java was developed as language that is machine independent and that is object oriented. Java source code is compiled to a sequence of instructions with operation code and operands, the sequence being better known as bytecode or binarycode. Bytecode can be loaded and run on a virtual machine (VM). The VM is in fact a software emulation program that is written for any given computer hardware system. The VM causes the host computer, whatever its architecture, to emulate a machine that runs directly on binary code. The application consequently runs on any computer "on top of" the VM for that computer. Often, the VM is incorporated in an internet browser program.

Where the application is written in Java, the selection of natural language is accomplished by incorporating texts in various natural languages into the source code, for example, as predefined character strings. The source code including the character strings is then compiled to bytecode that is loaded and run.

Corrections to the text are very difficult to make. Current techniques require changing the text in the source code. Recompiling source code is time consuming. Also, the translator who writes a translation of the display text needs to have (i) the source code to make any changes, as well as (ii) an appropriate source-code editing program. If the translator also wishes to test the application, he or she needs (iii) access to the computer.

Besides adapting texts, there are further occasions to configure the application. Often, regionalization not only requires translating natural languages (e.g., from English to German), but also requires adapting graphical icons, such as national flag symbols.

Hence, there is an ongoing need for a technical solution that provides method, system and computer program for rendering objects on a display with automatic loading of the required configuration independent from source code.

SUMMARY OF THE INVENTION

The following explanation conveniently uses text objects to be rendered on the display. In general, objects can also be graphical symbols or anything else that is rendered by an application written in java programming language.

In one embodiment, the present invention provides a technical solution to the above-mentioned problem by providing a localization class (preferably, belonging to the loadable Java program application) that defines the text objects of the display. The virtual machine loads the class and determines, by user input or otherwise, of which of a group of natural languages available should be used for the text. Based on the determination, an initializer (preferably of Java code) loads the text in the appropriate language from a markup language document (preferably, XML) to initialize the variables in the application. The application then can proceed to run as usual. Displays include text defined by the localization class, and the exact strings of characters used in the text are those defined during initialization. Consequently, the user is shown displays in the appropriate natural language.

Initialization can occur at any time prior to executing the application. Conveniently, initialization takes place when the virtual machine starts operating, or each time a new user starts using the computer "log on" time). This has the advantage that the virtual machine is ready executing any application in the appropriate language. Initialization can also occur as one of the first steps of the application.

Preferably, after the static initialization, the fields of the localization class are checked to confirm that all fields contain text.

In one embodiment, the present invention relates to a computer program product having a plurality of instructions for causing a processor of a computer to initialize a virtual machine that subsequently executes an application to render an object on a display of the computer. The computer program product may include instructions for: providing a class that has a variable, the variable being part of the application; selecting a property value that determines to selectively render the object from a first object set or from a second object set; reading an object representation for the variable from a markup language document in dependence on the property value from a first representation set or from a second representation set; and assigning the object representation to the variable in the class.

It is an advantage of the present invention that objects, variables and property values can be stored in different storage locations and can be provided at different times. Hence, a person who does not have programming skills can still change the objects and property values. Further, the application can be tested with objects of a first set (e.g. original language), wherein further sets can be added at any time without modifying the application nor modifying the initializer.

In another embodiment, preferably, the instructions may cause the processor to treat the object representation as a pointer to a file. This is convenient if the object has a size that is difficult to accommodate by the application. The file can be stored in the memory of the executing computer or elsewhere on a network computer.

Further, preferably, the instructions may cause the processor to assign a copy of the representation. This is convenient for small sized objects such as text objects. Further files are not required.

Additionally, the instructions may cause the processor to receive the markup language document via the internet. This is convenient for customizing the application from a remote computer.

Moreover, preferably, the instructions may cause the processor to perform the step reading by identifying a plurality of variables from the byte-code of the application and by subsequently reading representations for at least some of the variables from the markup language document.

It is an advantage that variables to be localized have to be included in the markup language document only, but do not have to be modified in the application. Existing applications can be used as well so that down-compatibility is provided. In another embodiment, the present invention relates to a method to initialize a virtual machine that subsequently executes an application to render an object on a display of a computer. The method may include: providing a class that has a variable, the variable being part of the application; selecting a property value that determines to selectively render the object from a first object set or from a second object set; reading an object representation for the variable from a markup language document in dependence on the property value from a first representation set or from a second representation set; and assigning the object representation to the variable in the class.

Further, preferably, in the reading step, a plurality of variables may be identified from the byte-code of the application, and subsequently representations may be read for at least some of the variables from the markup language document.

Additionally, preferably, in the providing step, identification of a further variable that has already been initiated may be provided and, in the reading step, a representation for the further variable may be read from the markup language document.

Moreover, preferably, in the event that the markup language document has changed, the method further comprises re-initializing the virtual machine by: identifying a further representation of the object from the modified markup language document depending on the property value; identifying the corresponding variable for that further representation by parsing the application; and re-initializing the variable according to the property value by the object representation object that was identified.

In yet another embodiment, the present invention relates to a computer system that initializes a virtual machine for subsequently executing an application that renders an object on a display of a computer. The system may comprise: a class provider as a means for providing a class that has a variable, the variable being part of the application; a property value selector as a means for selecting a property value that determines to selectively render the object from a first object set or from a second object set; and a reader as a means for reading an object representation for the variable from a markup language document in dependence on the property value from a first representation set or from a second representation set and as a means for assigning the object representation to the variable in the class.

Further, the reader may identify a plurality of variables from the byte-code of the application and subsequently may read representations for at least some of the variables from the markup language document.

Moreover, the class provider may identify a further variable that has already been initiated, and the reader may read a representation for the further variable from the markup language document.

Additionally, the system may re-initialize the virtual machine in the event that the markup language document has changed. Therefore, the system may include: means for identifying a further representation of the object from the modified markup language document depending on the property value; means for identifying the corresponding variable for that further representation by parsing the application; and means for re-initializing the variable according to the property value for the object representation object that was identified.

DETAILED DESCRIPTION

Figure 1:
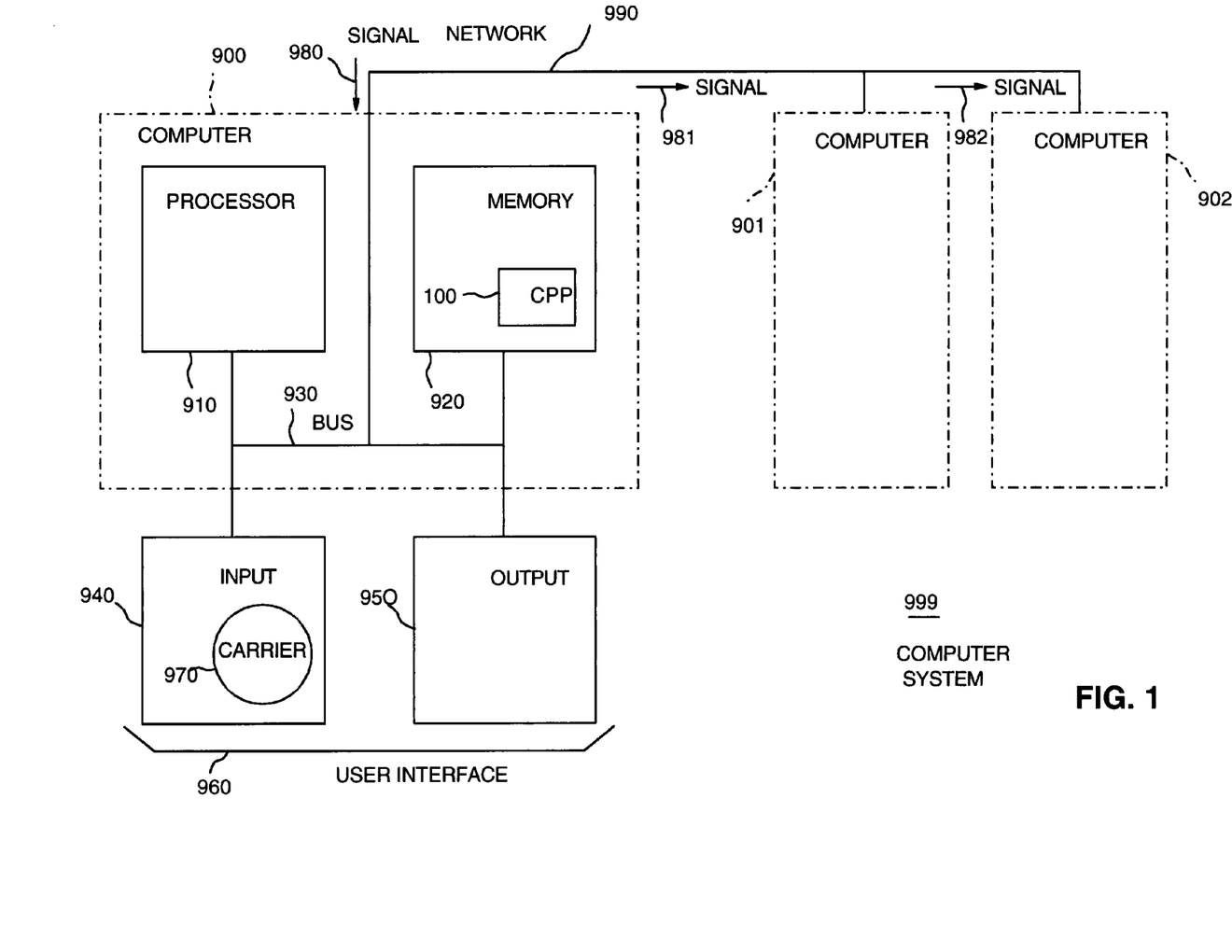
FIG. 1 is a simplified block diagram of a computer network system.

FIG. 1 illustrates a simplified block diagram of computer network system 999 having a plurality of computers 900, 901, 902 (or 90$q$, with q=0 ... Q−1, Q any number).

Computers 900-902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, or memory stick.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in system network system 999. For example and without the intention to be limiting, CPP 100 can be available as source code in any programming language, and as object code "binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or other type of display, (cathode ray tube (CRT), flat panel display, liquid crystal display (LCD), a speaker, a printer, a plotter, a vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are know, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by the program.

Figure 2:
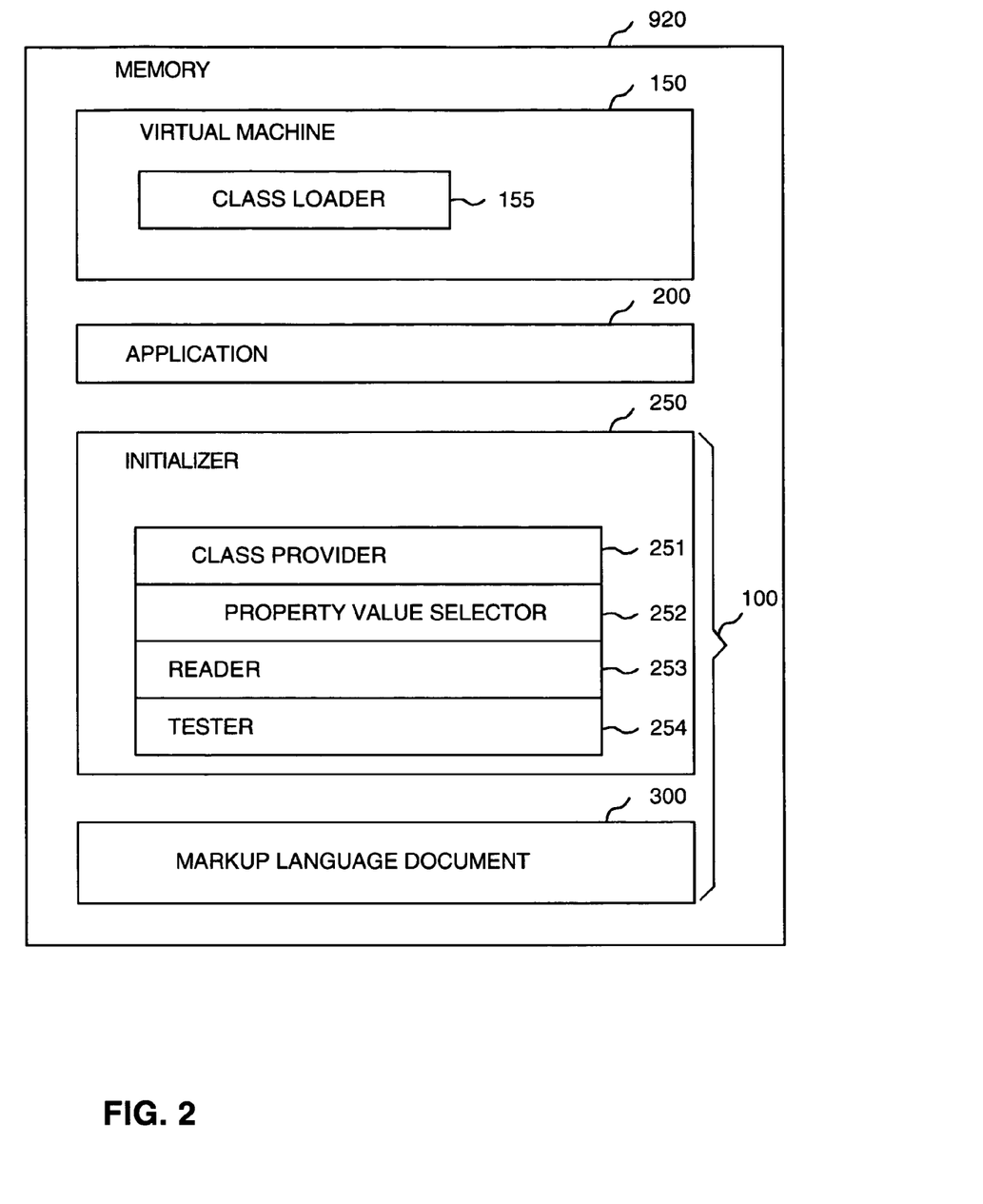
FIG. 2 is a simplified block diagram of software components in the memory of a computer.

FIG. 2 is a simplified block diagram of the software components in memory 920 of computer 900 (cf. FIG. 1): virtual machine (VM) 150 with Java class loader 155, application 200, initializer 250 of the present invention (details in FIGS. 3-4) and markup language document 300 of the present invention.

The software components form software system 150/200/250/300. Storing the components in a single memory (e.g., in memory 920 of computer 900) is convenient, but not required. As mentioned in connection with FIG. 1, memory 920 can have physically separated portions. Components can even be distributed the different computers. Organizing software components, for example, by files and directories is well known. Bytecode components are conveniently stored in ".class" files. Retrieving software components from anywhere in memory is well known too and therefore not further detailed. VM 150 is conveniently integrated into a browser program, well known in the art.

During initialization of VM 150 according to the present invention, only initializer 250 and document 300 need to be present. Application 200 can still be under development and can be loaded later.

Initializer 250 and markup language document 300 each are referred to as computer program product 100. It is an advantage of the present invention that initializer 250 and markup language document 300 can be provided, stored, and modified independently.

Initializer 250 comprises the following components: class provider 251, property value selector 252, reader 253, and optionally tester 254. Markup language document 300 is, preferably, an XML—document (details in FIG. 6). Preferably, application 200 has been compiled to bytecode. FIGS.

Figure 3:
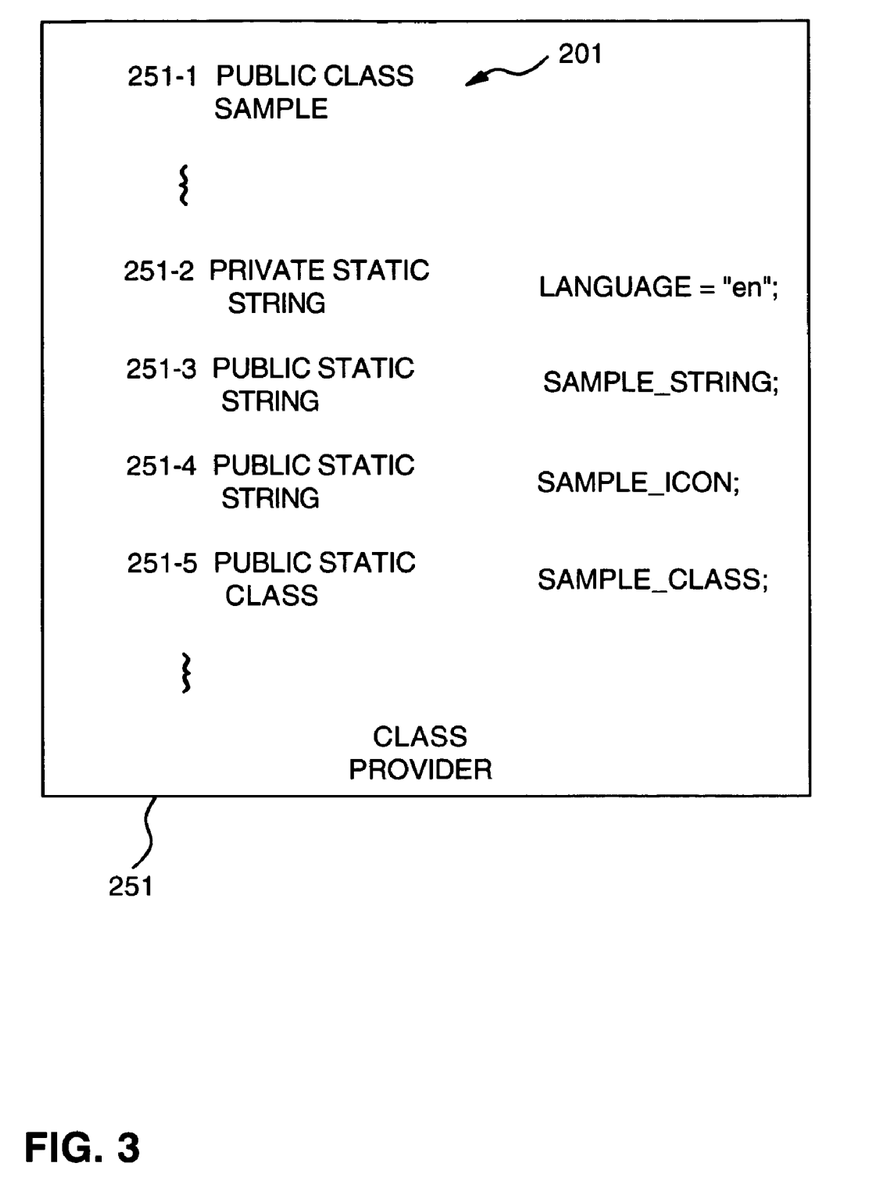
FIG. 3 is a simplified code script of a class provider in an intitializer.
Figure 4:
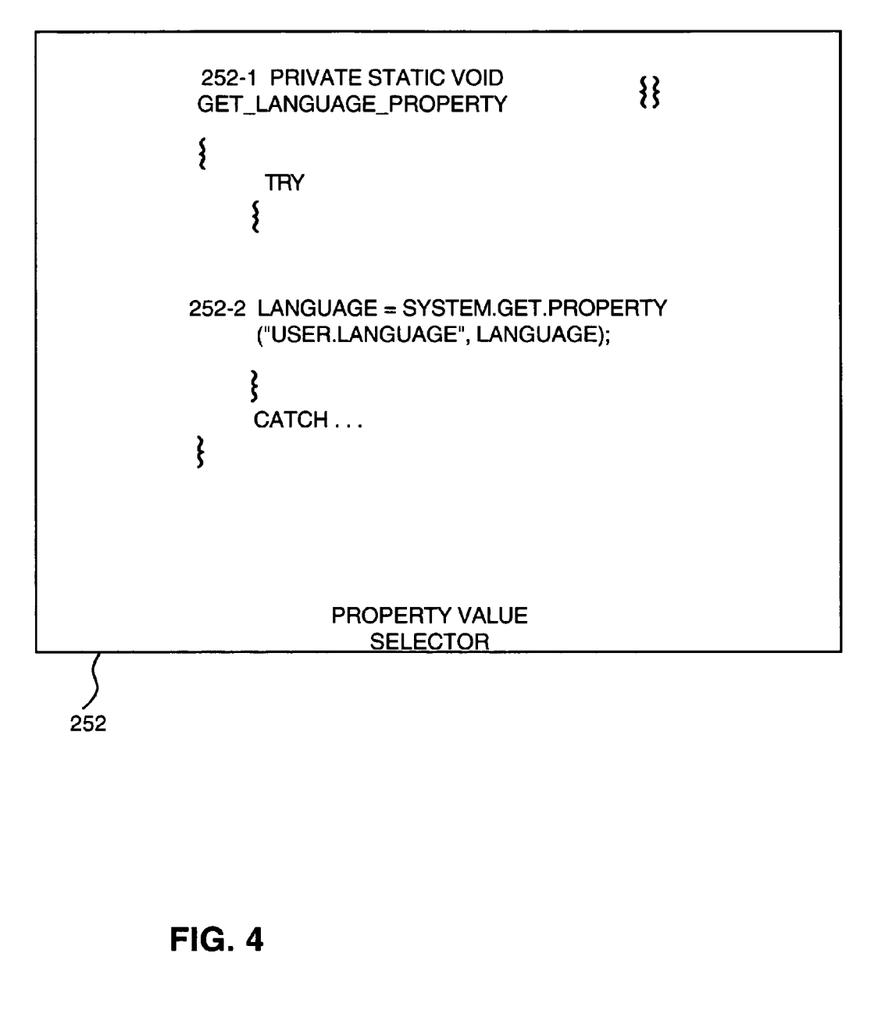
FIG. 4 is a simplified code script of a property value selector in the initializer.
Figure 5:
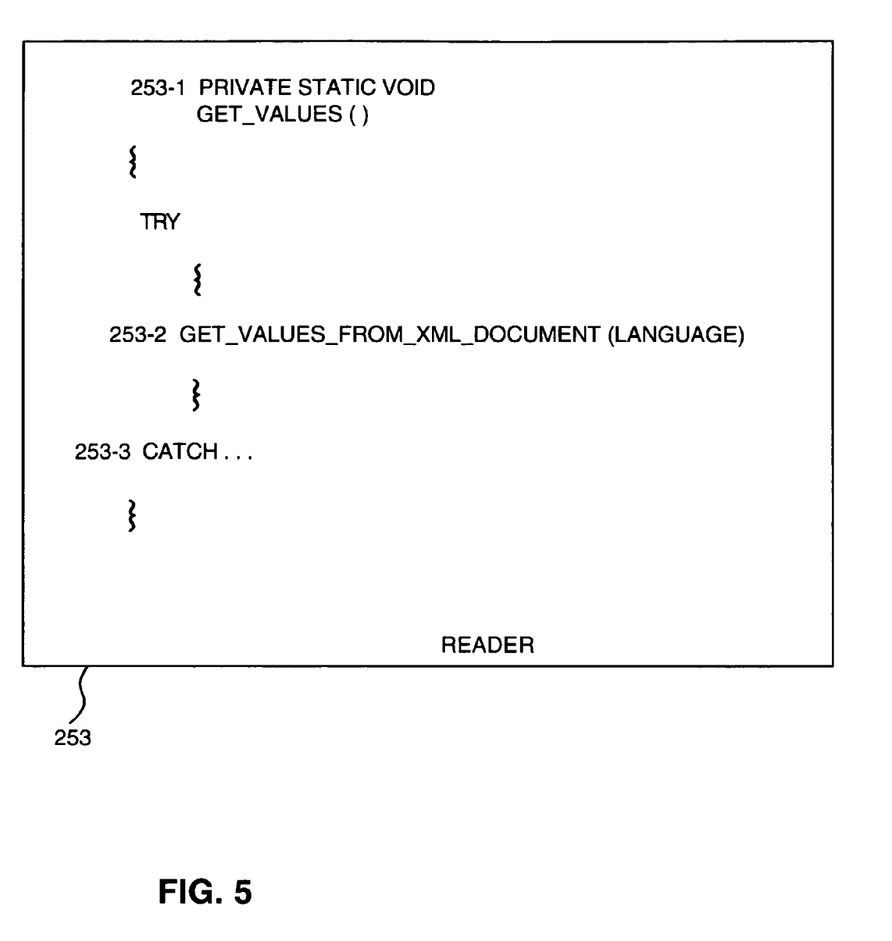
FIG. 5 is a simplified code script of a reader in the initializer.

3-5 illustrate the components of initializer 250 by code script examples. Reference numbers are added on the left side to conveniently explain the scripts. Java source code is used here for explanation, terms like "public", "private", "static", "string", "void", are well-known to those of skill in the art and will not be explained further. For convenience, writing by uppercase and lowercase letters is not distinguished. Since initializer 250 cooperates with virtual machine 150, components such as class provider 251, selector 252, reader 253, and tester 254 are stored in bytecode. Persons of skill in the art can compile these components before without the need explanation herein.

Preferably, components 251, 252, 253, and 254 are called one after another. However, the order might change to accommodate modifications: optionally, selector 252 is executed prior to provider 251.

FIG. 3 is a simplified code script of class provider 251 in intitializer 250 of FIG. 2. Class provider 251 provides (cf. step 410 in FIG. 9) class 201 having at least one variable, wherein the variable represents an object. Preferably, a plurality of object representing variables is provided: a first class for a string—variable SAMPLE_STRING (251-3), a second class for a string—variable SAMPLE_ICON (251-4), and a third class for a class—variable SAMPLE_CLASS (251-5).

SAMPLE_STRING represents a text label object (cf. 310/ 320 in FIG. 8) by storing the text to be displayed; SAMPLE_ICON represents an icon (cf. 311/321 in FIG. 8) by storing the name of a graphic file (e.g., GIF-type file). SAMPLE_CLASS represents an object of the type java.lang.class that represents a java class (not an instance of the class, but the class itself).

Figure 6:
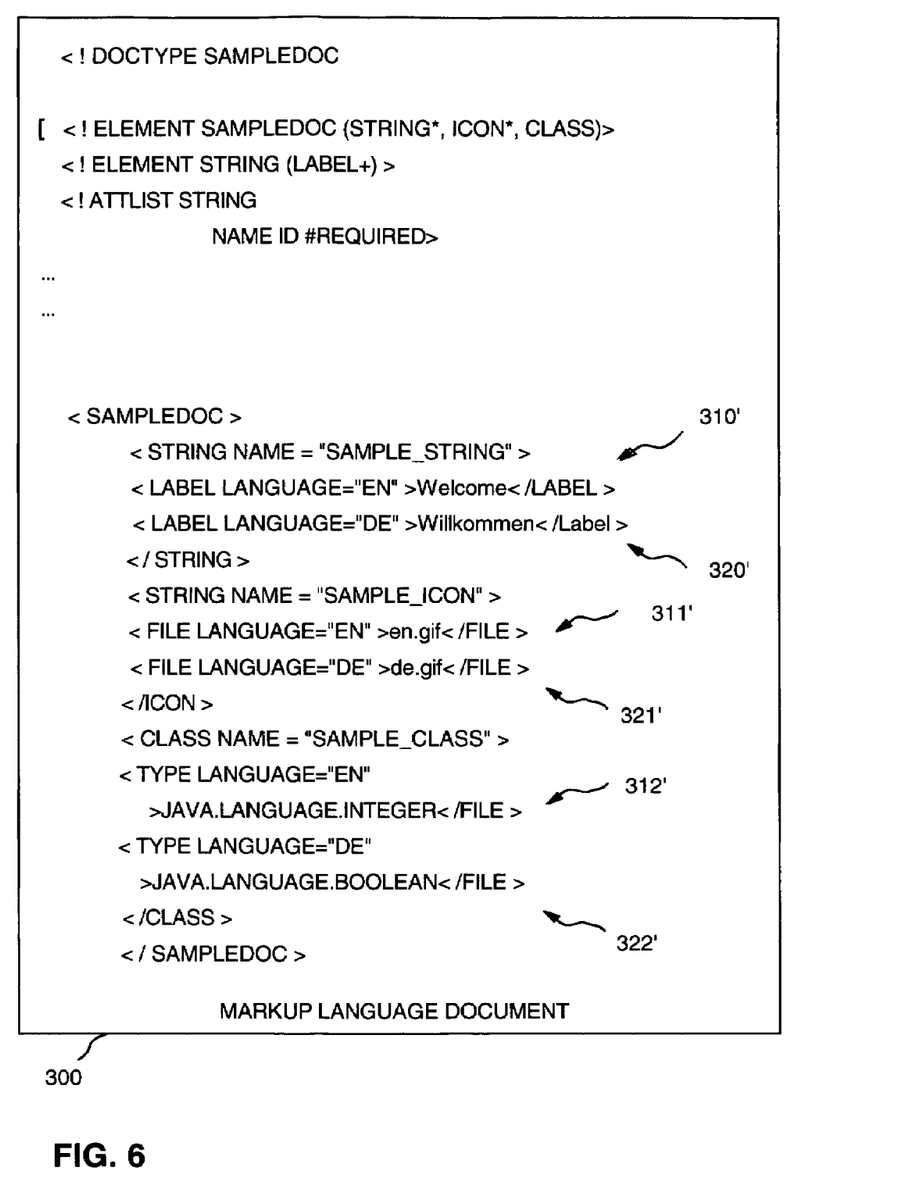
FIG. 6 is an example of a markup language document.

SAMPLE_STRING, SAMPLE_ICON, and SAMPLE_CLASS will be assigned values by reader 253 that evaluates markup language document 300 (cf. FIGS. 5-6). Having 3 different classes "SAMPLE" is convenient for explaining different object types. This is convenient, but not essential for the present invention.

Class provider 251 does not yet initialize the classes. In one embodiment of the present invention, the Java-class "SAMPLE" (cf. line 251-1) comprises a further class for a string-variable LANGUAGE (251-2). LANGUAGE will be assigned a value by property value selector 252 (cf. FIG. 4). LANGUAGE is an auxiliary variable for selecting objects but LANGUAGE does not represent the objects. Explaining LANGUAGE as part of class 201 is convenient for explanation, but not necessary for the present invention, LANGUAGE can be in a different class that is independent from class 201.

FIG. 4 is a simplified code script of property value selector 252. Selector 252 selects (cf. step 420 in FIG. 9) a property value for the variable LANGUAGE. Conveniently, selector 252 is implemented by an instruction sequence that (in Java source code) is defined by a function named "GET_LANGUAGE_PROPERTY" (cf. line 252-1). The assignment of predefined values to LANGUAGE determines whether application 200 renders objects of a first object set (310, 311, 312) or of a second object set (320, 321, 322).

In the example, selector 252 reads an environment variable (e.g., "user.language", cf. line 252-2) that is already set on computer 900. Selector 252 assigns the contents for the environment variable to the property value LANGUAGE, such as "en" for English or "de" for German. English "en" is a default value.

Using objects of first and second sets is convenient for explanation; persons of skill in the art can use a plurality with more than two sets without departing from the present invention.

FIG. 5 is a simplified code script of reader 253. Reader 253 reads (cf. step 430 in FIG. 9) object representations for the objects of the selected object set from a markup language document (GET_VALUES, cf. line 253-1), preferably from markup language document 300 and assigns (cf. step 440) the object representations to the variables of class 201 according to the property value (GET_VALUES_FROM_XML_DOCUMENT (LANGUAGE), cf. line 253-2). Conveniently, reader 253 comprises an error handling routine (CATCH, cf. line 253-3) known in the art. The function of reader 253 is now explained in connection with the example of markup language document 300.

FIG. 6 is an example of markup language document 300. Document 300 starts with a document type definition (DTD) that is well known in the art. The DTD comprises definitions for elements and attributes; for simplicity of explanation, only the first definitions lines are given and further lines are abbreviated by ellipsis.

Markup language document 300 comprises representations of the objects ("object representations"). Object representations are distinguished into copy representations (to be copied to the variable) and pointer representations (being a pointer to a file elsewhere). The term "pointer" conveniently stands here for any means to build the object. The means can be located outside the class (as in a separate database) or inside the class (embedded).

In the example of FIG. 6, the object representations are: copy representation 310' for text object 310 (English), copy representation 320' for text object 320 (German), pointer representation 311' to a file "en.gif" to display graphic object 311 for use in connection with English text, pointer representation 312' to a file "de.gif" to display graphic object 321 for use in connection with German text, as well as pointer representations 312' and 322' for objects 312 and 322, respectively.

According to the property value (here: LANGUAGE), reader 253 reads the object representations 310', 311' and 312' for objects 310, 311, 312 of a first object set, or reads object representations 320', 321', 322' for objects 320, 321, 322 of a second object set.

In the example, the sets are distinguished by LANGUAGE being "en" for English in the first set and "de" for German in the second set. Having read the representations, reader 253 then initializes the variables of class 201 by the objects that are represented. In case of the first set, variable SAMPLE_STRING is set to "Welcom"; variable SAMPLE_ICON is set to "en.gif" and variable SAMPLE_CLASS is set to an instance of the class java.lang.Class (representing the java-class java.lang.Integer).

Persons of skill in the art can implement reader 253 without the need of further information herein. When the names of the variables and the value of LANGUAGE are known, for example, reader 253 can parse until identifying the appropriate representations.

It is an advantage of the present invention that changes in the objects are made in document 300, but not in application 200. For example, correcting the German text "Willkommen" (in object 320) to a more polite form "Herzlich Willkommen" (in object 320) is done document 300 by simply editing. In other words, application 200 and initializer 250 (both in bytecode) remain unchanged. This is an important feature for selling application 200 because it relives customers from modifying source code.

In the example of FIG. 6, document 300 conveniently comprises object representations for English and for German. Persons of skill in the art are able, based on the present invention herein, to use separate documents for each language. In this case, reader 253 would select either the English document or the German document for further processing.

As mentioned, markup language document 300 is, preferably, an XML-document; persons of skill in the art can use other markup language formats that function analogously.

Figure 7:
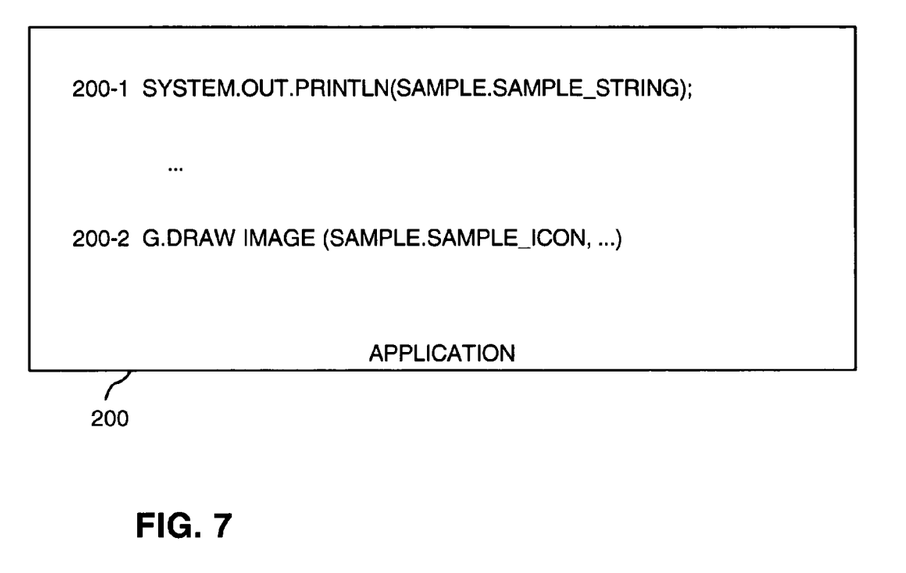
FIG. 7 is an example of an application.

FIG. 7 is an example of application 200 that causes computer 900 to either render objects 310 and 311 (first set, English) or objects 320 and 312 (second set, German) on display 950. It is an advantage that the set selection need not be written into application 200. For convenience of explanation, instructions that define the position of objects 310/320 and 311/312 on display 950 are not explained because such instructions are well known in the art. As mentioned, application 200 can be available in byte-code as well. When the application starts, the variables (e.g., SAMPLE_STRING, SAMPLE_ICONS, and SAMPLE_CLASS) have already been initialized with the appropriate objects. It is a further advantage of the present invention that existing applications can be used without modifying them.

Figure 8:
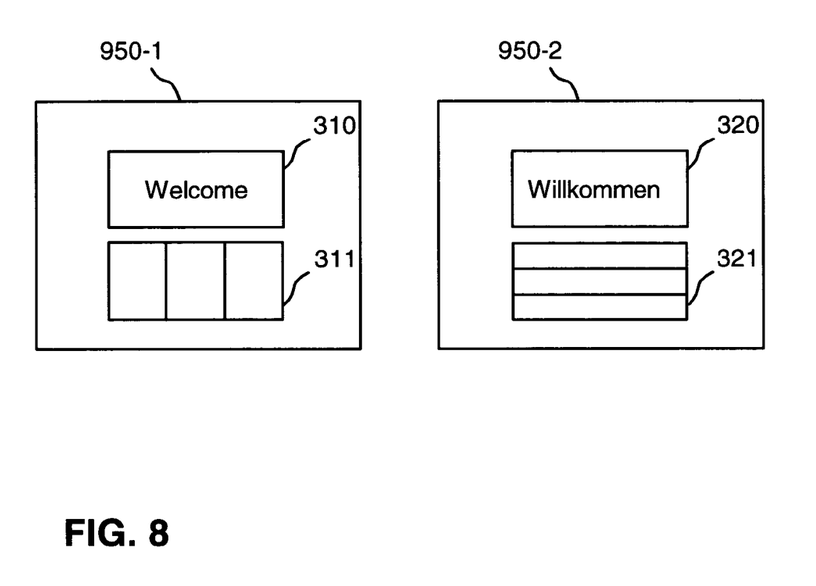
FIG. 8 illustrates simplified screen views with objects of the application of FIG. 7.

FIG. 8 illustrates simplified screen views with objects 310/320 and 311/312 of application 200. Display 950-1 illustrates first set objects 310 and 311 when initializer 250 initializes with LANGUAGE=en (English); display 950-2 illustrates second set objects 311 and 312 when initializer 250 initializes with LANGUAGE=de (German). The natural language of text objects 310 and 320 corresponds to country flags in graphical objects 311 and 321. It is an advantage of the present invention to allow displaying objects in the context of the country for that the application is designed. Further examples are symbols for local and international currencies.

Figure 9:
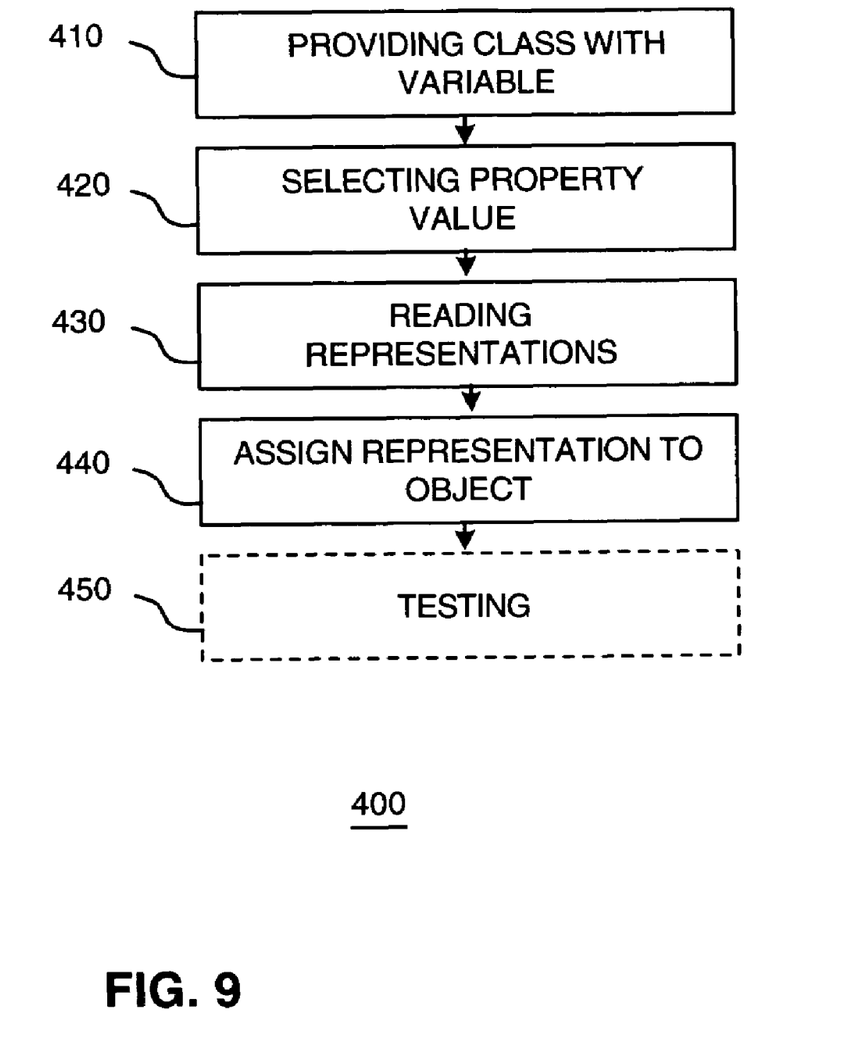
FIG. 9 is a simplified flowchart of a method of the present invention.

FIG. 9 is a simplified flow chart diagram of an exemplary method 400 of the present invention. In the following, method 400 is described under the assumption that all steps are performed successfully. Those of skill in the art can introduce checking steps to take appropriate actions in case of failures. FIGS. 4-5 mention such checking by well-known programming statements such as "if", "try", "catch", etc. Method 400 describes how initializer 250 (or in general terms: computer program product 100) causes processor 910 to initialize virtual machine (VM) 150. In other words, processor 910 prepares VM 150 for subsequent processing of application 200. Preferably, VM 150 subsequently executes application 200 to render an object on display 950 of computer 900. Method 400 to initialize VM 150 comprises the following steps:

providing 410 a class that has a variable, the variable being part of the application; selecting 420 a property value that determines to selectively render the object from a first object set or from a second object set; reading 430 an object representation for the variable from a markup language document in dependence on the property value from a first representation set or from a second representation set; and assigning 440 the object representation to the variable in the class.

Method 400 is executed prior to and independent from application 200. The time between executing method 400 and executing application 200 is not important; application 200 can follow immediately or after any waiting time. Also, multiple applications can use the same variables.

The following description follows FIGS. 3-8 for the example of rendering text object 310 "Welcome": In step 410, processor 910 provides class 201 with variable SAMPLE_STRING (cf. 251-3 in FIG. 3). SAMPLE_STRING is part of application 200 (cf. 200-1 in FIG. 7). In step 420, processor 910 selects property value LANGUAGE=en that determines to render object 310 in English. In step 430, processor 910 reads object representation 310' (cf. FIG. 6, "Welcome") for the variable SAMPLE_STRING from markup language document 300 (cf. FIG. 6) in dependence on the property value LANGUAGE="en" from first representation set 310'. In step 440, processor 910 assigns the object representation 310' to variable SAMPLE_STRING in class 201. In other words, SAMPLE_STRING="Welcome". Method 400 is now finished; when VM 150 later executes application 200 then object 310 is displayed.

In other words, after having performed method 400, virtual machine 150 is initialized and ready to execute application 200.

As in the example, processor 910 assigns a copy of representation 310' "Welcome") to SAMPLE_STRING. This is convenient when the size of the object can be accommodated by application 200. Optionally, processor 910 treats the object representation as a pointer to a file. For example, pointer representations 311' and 312' are pointers to files "en.gif"and "de.gif", respectively.

Optionally, processor 910 receives markup language document 300 or initializer 250 via the Internet from a server computer. Browser applets are convenient therefore.

Although various embodiments of the invention have been described in connection with a single class (cf. FIG. 3) which is convenient for explanation, it is not limiting. Based on the description herein, persons of skill in the art are now able to introduce further classes and further markup language documents as it might be convenient when the application comprises multiple modules.

Figure 10:
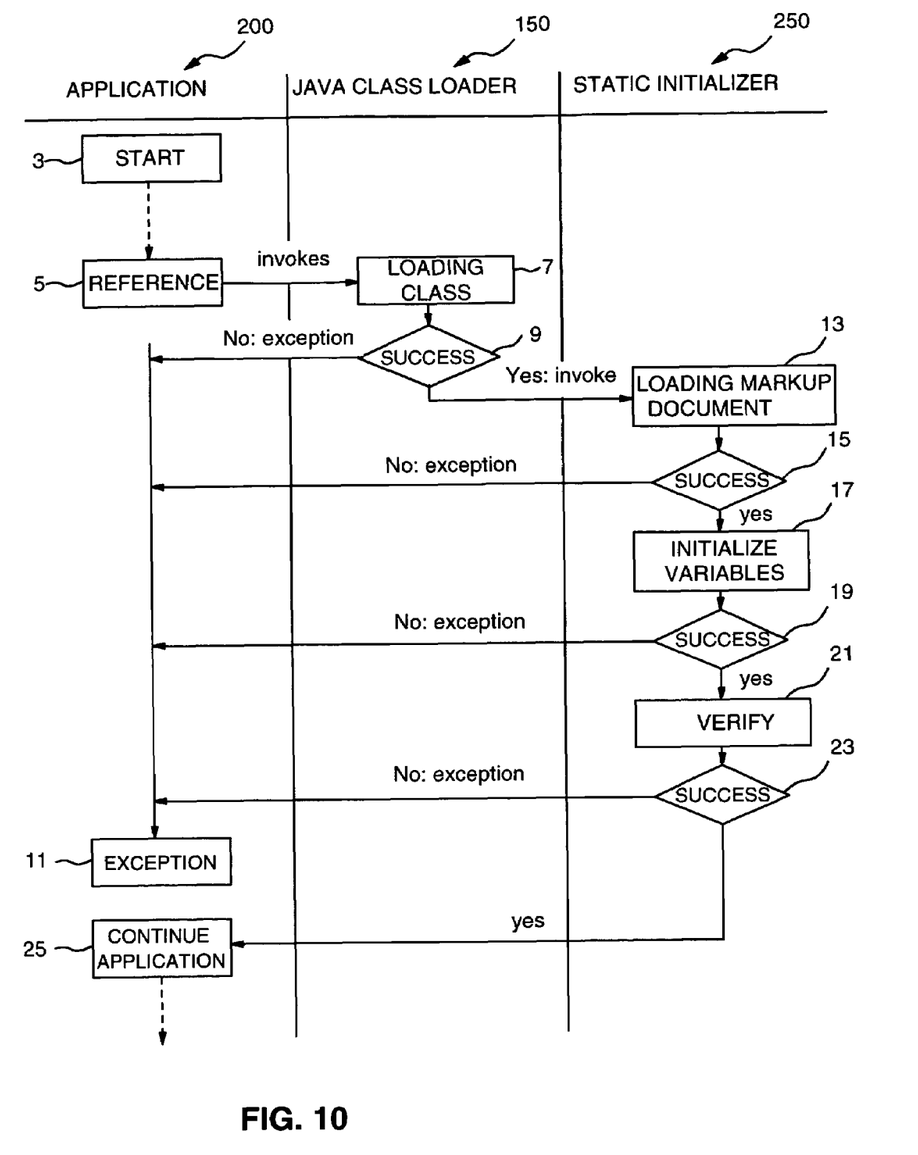
FIG. 10 is a detailed flowchart showing the operation of a computer according to a first preferred embodiment the invention.

FIG. 10 is a detailed flowchart showing the operation of computer 900 according to the invention in a first preferred embodiment. Application 200 starts (step 3) and the code thereof makes a reference (step 5) to class 201. Starting application 200 at this early time point is convenient for triggering the next steps, but not required. The reference to class 201 may be caused by creating an instance of class 201, or by accessing one of the static methods or functions of class 201.

Class 201 defines the set of all of the text fields displayed to the user in running application 200. Use of class 201 allows the user to alter the text displayed in the application so as to be appropriate to the location of usage, or to the individual user's linguistic requirements. Text-defining localization class document is loaded (step 7) by Java class loader 155. If the read fails (decision 9) an exception occurs (terminal step 11). What happens where an exception occurs will depend on application 200, but most commonly will result in display of an error message and a failure and exit of application 200, since application 200 would have no text to put up in any display.

The selection of which available natural language is to be used for display may be made by requesting a user input selecting the language. Once entered, this selection may remain the controlling selection. Alternatively, the selection may be input at every start of the application. Other determinations of location may also be used.

If the read is successful, initializer 250 is executed, and markup language document 300, preferably in XML format (step 13) is loaded. Document 300 is parsed using an XML parser, of which several are available on the market (e.g., document object model parser). If loading of document 300 fails (decision 15), an unchecked exception is taken (terminal step 11) and, most preferably, application 200 terminates.

If the load is successful, the variables described in document 300 are initialized (step 17). For every variable, document 300 contains a name (e.g., SAMPLE_STRING) and a character string value (e.g., "Welcome"). The value is then assigned to the variable with that name in class 201. If the variable represents a more complex data type, additional steps may be included before finally assigning the variable value, such as, for example, where an image for an icon is required (cf. en.gif for object 311). If any part of this procedure fails (decision 19), an exception is also thrown (terminal step 11).

If the initializing step 17 is successful, the variables are then verified (step 21). Each variable is checked to see if its value is the default value (decision 23); if so, then the variable was not initialized, and an exception 11 is thrown. Otherwise, the initialization was successful, and the application proceeds (step 25) to normal operation.

The loading and parsing of document 300, as well as the initialization of the variables is all done automatically when class 201 is referenced (i.e. used the first time). The checking of the variables is then performed in a second step to make sure that they are all properly initialized. The code for this processing is located in the static initializer of the Java class. This code is executed by the Java class loader when the class is loaded, even before the first instance of the class is created. Since the class loader does the initialization, it is only done once, and not every time an instance of the class is created. Initialization and verification of the class variables is done before the first class is created. This guarantees that all localized variables have been initialized before the application starts. Any errors or non-initialized variables are detected before the application starts; so the application itself does not need to do any additional or extensive checks in addition to those done at initialization.

A primary benefit of this system is that localized versions of classes can be created and added without needing to change or re-compile (or even to have a copy of) the Java source code. Any edits or amendments to any translations, such as to correct errors discovered after entry, can be easily done, since the language text is stored in the XML document. XML documents can be easily edited using a simple text editor, and no special tools are needed. In terms of extending the software, the present system allows for this easily. If the developer wishes to extend a localized class, he needs only to add a new variable. The checks for this new variable are performed automatically without the need to write any additional code.

Also, where a translator wishes to add a new language version for application 200, this can be done without the aid of a software developer. The translator can simply translate the XML document into a new natural language. The XML parser verifies the completeness of the translation of the variables, and the class definition itself verifies that a translation of each variable is provided and loaded.

Consequently, a translator can translate, test the translation running on the application, and include a new language version in the application independent of the developer, and completely without need-of any source code.

In other words, the various embodiments of invention also relate to a method for providing objects (e.g., texts, icons) in a display for Java-type computer application 200. The method may include providing class 201 in application 200, class 201 defining objects 310, 320 of the display; providing markup language document 300 (e.g., XML) containing a plurality of object representations 310', 320'; loading class 201 on computer 900 to run application 200; determining which of the representations 310', 320' is to be used for the display; initializing class 201 based on the determination with the markup language document 300; and running application 200 with class 201 initialized to said representations.

A second preferred embodiment of the present invention is now described. It can be combined with the first embodiment. Optionally, this embodiment of the present invention takes advantage of the reflection feature in Java, explained, for example, in the following article: "Glen McCluskey: 'Using Java Reflection', January 1998, http://developer.java.sun-.com/developer/technicalArticles/ALT/Reflection/" The names of the variables can be retrieved from byte-code.

Optionally, processor 910 perform step reading 430 by identifying a plurality of variables from the byte-code of application 200 and by subsequently reading representations for at least some of the variables from the markup language document 300.

For example, in a first sub-step, processor 910 identifies a plurality of variables from the byte-code of application 200. Preferably, this is accomplished by reflection. In the example of FIG. 7, application 200 has variables SAMPLE_STRING and SAMPLE_ICON. Not illustrated, but application 200 can have further variables, such as COLOR_SAMPLE to indicate the background illumination of display 950. In a second sub-step, processor 910 then reads representations 310' "Welcome") and 311' ("len.gif") for variables SAMPLE_STRING and SAMPLE_ICON, respectively, from markup language document 300. The other variable COLOR_SAMPLE remains unchanged, because it is not included in document 300.

Method 400 can comprise an additional step testing 450. Processor 910 parses markup language document 300 to verify syntax of the markup language. Syntax errors that are instruced into document 300, for example, be the translator are indentified.

Describing tester 254 independently from reader 253 is convenient for explanation, but not necessary for the present invention. Preferably, tester 254 and reader 253 operate in close cooperation; or tester 254 and reader 253 form a single unit.

Using reflection, tester 254 optionally (cf. FIG. 254) evaluate application 200 to identify the variables used by application 200. In the example of FIG. 7, these variables are SAMPLE_STRING and SAMPLE_ICON. In the way described above, information about the existence of a variable in application 200 is used to selectively initiate the variable with object representations from document 300 (if represented in document 300). Thereby, object selection takes place according to a property value (e.g., LANGUAGE).

Referring back to FIG. 10, reflection is used in steps 17 and 21.

Having described details of method and computer program, the present invention is now summarized as a computer system (having at least one computer such as computer 900). Computer system 900 initializes virtual machine 150 for subsequently executing application 200 that renders object 310/320 on display 950 of computer 900. Class provider 251 is a means for providing 410 class 201 that has variable 251-3 (part of the application 200); property value selector 252 is a means for selecting 420 property value 252-5 that determines to selectively render the object from first object set 310 or from second object set 320; and reader 253 is a means for reading 430 object representation 310'/311' for the variable from markup language document 300 in dependence on the property value from first representation set 310' or from second representation set 320' and is a means for assigning 440 object representation 310'/311' to variable 251-3 in class 201.

Preferably, reader 253 identifies a plurality of variables from the byte-code of application 200 and subsequently reads representations for at least some of the variables from markup language document 300. Preferably, class provider 251 identifies a further variable that has already been initiated, and reader 253 reads a representation for the further variable from markup language document 300.

Preferably, the computer system re-initializes virtual machine 150 in the event that markup language document 300 has changed. Therefore, the system comprises means for identifying a further representation of the object from the modified markup language document depending on the property value; means for identifying the corresponding variable for that further representation by parsing application 200; and means for re-initializing 440 the variable according to the property value for the object representation objects that was identified.

The terms used herein should be considered terms of description rather than limitation, as those of skill in the art with this specification before them will be able to make changes and modifications therein without departing from the scope of the claims. In particular, the term Java or Java-type should be understood to embrace any analogous language, e.g., a language that defines classes and initializes them, and not to necessarily be limited to any specific programming language product.

LIST OF REFERENCES

| Reference | Element |
| --- | --- |
| 100 | computer program product |
| 150 | virtual machine (VM) |
| 155 | class loader |
| 200 | application |
| 201 | class |
| 250 | initializer |
| 251 | class provider |
| 252 | property value selector |
| 253 | reader |
| 254 | tester |
| 300 | markup language document |
| 310', 311', 312', 320'. 321', 322' | object representations |
| 310, 311, 320, 321 | objects |
| 410 | providing class with variable |
| 420 | selecting property value |
| 430 | reading representations |
| 440 | assign representations to object |
| 450 | testing |
| 900, 901, 902 | computer, computer system |
| 910 | processor |
| 920 | memory |
| 940 | input device |
| 950 | output device |
| 960 | user interface |
| 970 | carrier |
| 980, 981, 982 | signal |
| 990 | network |
| 999 | computer system |

The invention claimed is:

1. A computer-readable medium comprising instructions, which, when executed by a processor, cause the processor to perform a method of initializing a virtual machine for rendering an object on a computer display, the method comprising:
   providing an application;
   receiving a property value corresponding to an application format;
   identifying a plurality of variables from a byte-code of the application;
   reading a plurality of object representations for at least some of the plurality of variables from a markup language document;
   selecting an object representation from the markup language document according to the application format specified in the property value, wherein the object representation is selected from the plurality of object representations with same meanings and different formats; and
   assigning the object representation from the markup language document to a variable in the application by assigning the object representation in the markup language document to the variable in the application;
   re-initializing the virtual machine upon a modification of the markup language document, the re-initializing comprising:
      identifying a new object representation from the modified markup language document according to the application format specified in the property value;
      identifying the variable for the new object representation by parsing the application; and
      re-initializing the variable based on the new object representation.

2. The computer-readable medium of claim 1, wherein the object representation comprises a pointer to a file.

3. The computer-readable medium of claim 1, the method further comprising receiving the markup language document via the Internet.

4. The computer-readable medium of claim 1, wherein the providing further comprises identifying a further variable that has already been initiated and wherein the selecting further comprises reading a representation for the further variable from the markup language document.

5. The computer-readable medium of claim 1, the method further comprising performing re-initialization while the virtual machine executes the application.

6. A method for initializing a virtual machine (VM) for rendering an object on a display of a computer, the method comprising:
   providing an application;
   receiving a property value corresponding to an application format;
   identifying a plurality of variables from a byte-code of the application;
   reading a plurality of object representations for at least some of the plurality of variables from a markup language document;
   selecting an object representation from the markup language document according to the application format specified in the property value, wherein the object representation is selected from the plurality of object representations with same meanings and different formats; and
   assigning the object representation from the markup language document to a variable in the application by assigning the object representation in the markup language document to the variable in the application;
   re-initializing the virtual machine upon a modification of the markup language document, the re-initializing comprising:
      identifying a new object representation from the modified markup language document according to the application format specified in the property value;
      identifying the variable for the new object representation by parsing the application; and
      re-initializing the variable based on the new object representation.

7. The method of claim 6, wherein the providing an application further comprises identifying a further variable that has already been initiated and wherein reading further comprises reading a representation for the further variable from the markup language document.

8. A computer system that initializes a virtual machine (VM) for rendering an object on a display of a computer, the computer system comprising:
- a processor;
- a computer memory device configured to store an application;
- a property value selector configured to receive a property value corresponding to an application format;
- a reader executing on the processor, the reader configured to:
  - identify a plurality of variables from a byte-code of the application,
  - read a plurality of object representations for at least some of the plurality of variables from a markup language document,
  - select an object representation from the markup language document according to the application format specified in the property value, wherein the object representation is selected from the plurality of object representations with same meanings and different formats, and
  - assign the object representation from the markup language document to a variable in the application, by assigning the object representation in the markup language document to the variable in the application; and
- means for re-initializing the virtual machine upon a modification of the markup language document the means for re-initializing further comprising:
  - means for identifying a new object representation from the modified markup language document according to the application format specified in the property value;
  - means for identifying the variable for the new object representation by parsing the application; and
  - means for re-initializing the variable based on the new object representation.

9. The computer system of claim 8, wherein the reader is further configured to:
- identify a further variable that has already been initiated, and
- read a representation for the further variable from the markup language document.

10. The computer-readable medium of claim 1, wherein the application format comprises a natural language.

11. The method of claim 6, wherein the application format comprises a natural language.

12. The computer system of claim 8, wherein the application format comprises a natural language.

* * * * *